United States Patent [19]

Chainer et al.

[11] Patent Number: 5,392,177
[45] Date of Patent: Feb. 21, 1995

[54] SEALED DASD HAVING HUMIDITY CONTROL AND METHOD OF MAKING SAME

[75] Inventors: Timothy J. Chainer, Mahopac; Emanuel I. Cooper, Riverdale; Suryanarayan G. Hegde, Hollowville; Chandrasekhar Narayan, Hopewell Junction, all of N.Y.

[73] Assignee: International Business Machines Corporation, Armonk, N.Y.

[21] Appl. No.: 248,137

[22] Filed: May 24, 1994

Related U.S. Application Data

[63] Continuation of Ser. No. 771,689, Oct. 4, 1991, abandoned.

[51] Int. Cl.6 .............................................. G11B 33/14
[52] U.S. Cl. .................................................. 360/97.02
[58] Field of Search ............... 360/97.01, 97.02, 97.03, 360/97.04; 236/44 C

[56] References Cited

U.S. PATENT DOCUMENTS

| | | | |
|---|---|---|---|
| 4,307,425 | 12/1981 | Kaneko et al. | 360/98 |
| 4,556,969 | 12/1985 | Treseder et al. | 360/97.03 |
| 4,620,248 | 10/1986 | Gitzendanner | 360/97 |
| 4,642,715 | 2/1987 | Ende | 360/99 |
| 4,684,510 | 8/1987 | Harkins | 423/210 |
| 4,789,913 | 12/1988 | Gregory et al. | 360/97 |
| 4,831,475 | 5/1989 | Kakuda et al. | 360/97.03 |
| 4,831,476 | 5/1989 | Branc et al. | 360/97.02 |
| 4,863,499 | 9/1989 | Osendorf | 55/316 |
| 5,148,337 | 9/1992 | Cullen et al. | 360/97.04 |

Primary Examiner—David C. Nelms
Attorney, Agent, or Firm—David Aker

[57] ABSTRACT

A sealed direct access storage device wherein a head is positioned for interaction with a storage medium in which the relative humidity is controlled by placing a predetermined amount of desiccant and a predetermined amount of water in the sealed volume of the device. At any given steady state temperature within a predetermined operating range the water vapor within the free space within the device and the water contained in the desiccant are in equilibrium and the relative humidity is controlled within acceptable limits.

31 Claims, 2 Drawing Sheets

SEALED DASD HAVING HUMIDITY CONTROL AND METHOD OF MAKING SAME

This is a continuation of U.S. application Ser. No. 07/771,689, filed Oct. 4, 1991, now abandoned.

TECHNICAL FIELD

This invention relates to direct access storage devices. Particularly, it relates to the problem of humidity control in a direct access storage device (DASD) which is hermetically sealed.

BACKGROUND ART

Lower fly heights for read/write heads have become a determining factor in the density with which information can be written onto and read from high density magnetic media. In general, compact disk files achieve high density by utilizing ultraflat thin film disks with lubricated wear resistant overcoats. For a given slider design and head-disk surface interaction, the ability of the slider to fly over the disk is determined not only by the lubricated disk but also, to a considerable extent, by the relative humidity of the disk/head environment. In broad terms, a very low relative humidity results in poor start-stop tribology, and therefore poor reliability. On the other hand, excessive relative humidity contributes to excessive sticking force, when the head is stationary on the disk. This results in increased power consumption and possibly damage to head or suspension components.

U.S. Pat. No. 4,620,248 to Gitzendanner suggests that one technique for reducing humidity within the disk drive is to construct the drive so that the disk is in a sealed compartment, and a desiccant is improvised within the compartment to absorb water vapor. However, it is pointed out that pressure changes both inside and outside the compartment can damage the fluid shaft seal on the spindle motor if the pressure differential exceeds 0.75 inches of mercury. This patent teaches that a vent is necessary to equilibrate pressure between the inside and outside of the drive.

U.S. Pat. No. 4,863,499 to Osendorf points out that many hard disk drives are utilized with smaller personal computers in offices and residential environments where moisture can present a significant problem when the drive is shut down. This patent notes that to address this problem, many disk drive manufacturers place a desiccant package in their disk drives to absorb moisture. The desiccant package is usually sized to provide moisture absorption throughout the life of the drive. During operation, over a temperature range of, approximately, 10° C. to 60° C., moisture in the drive is either released or absorbed by the desiccant package during warm-up or cool-down, respectively. When the drive is not in operation, moisture enters the drive by way of diffusion through the hole in the breather or it will permeate through the cover gasket. Depending on the number of on/off cycles and the quiescent permeation rate through the gaskets, it may be possible that the desiccant pack will become saturated and thus will no longer control the relative humidity in the drive.

SUMMARY OF THE INVENTION

It is an object of the present invention to provide a sealed disk drive having adequate relative humidity control over a predetermined range of operating temperatures.

It is another object of the present invention to provide a method for constructing a sealed drive wherein the relative humidity is controlled.

In accordance with the invention, a direct access storage device including means for positioning a head for interaction with a storage medium comprises a sealed housing and a quantity of desiccant contained in said housing. The desiccant contains a predetermined percentage by weight of water, whereby relative humidity within the housing is maintained within a predetermined relative humidity range as temperature is varied over a predetermined temperature range. The desiccant may be any one of polyimide film or a high surface area oxide or desiccated gel based on silica and/or alumina and modified by the addition of other hydrous oxides such as titania, zirconia, boron oxide and magnesia. If the polyimide is used as part of a cable connector having a surface exposed to the interior of the sealed housing, the need for a separate desiccant inside the housing may be eliminated.

Also in accordance with the invention, a method for providing a direct access storage device having a housing, and within the housing means for positioning a head for interaction with a storage medium comprises the steps of: placing a desiccant containing a predetermined percentage by weight of water within the housing, and sealing the housing, whereby the relative humidity in the housing is maintained within a predetermined relative humidity range, as temperature is varied over a predetermined temperature range.

DETAILED DESCRIPTION OF THE PREFERRED EMBODIMENTS

Figure 1:
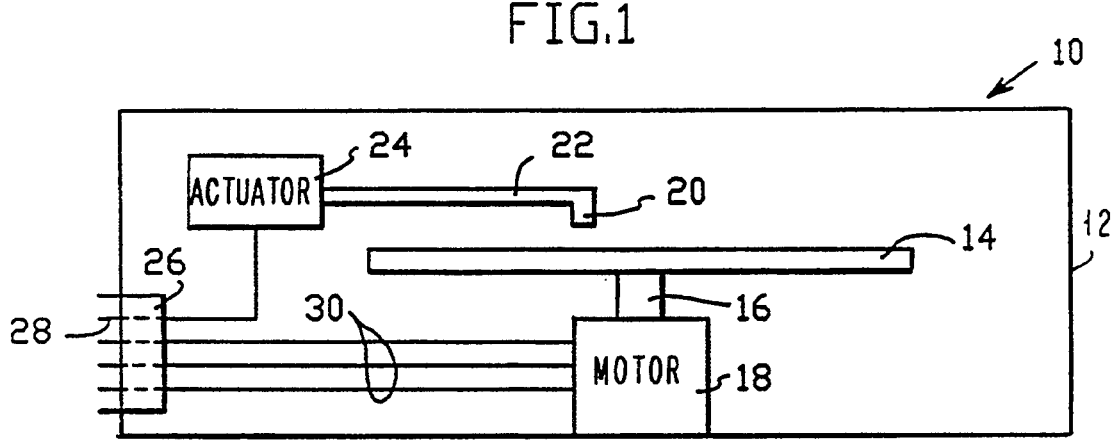
FIG. 1 is a cross-section of a first embodiment of the invention.
Figure 2:
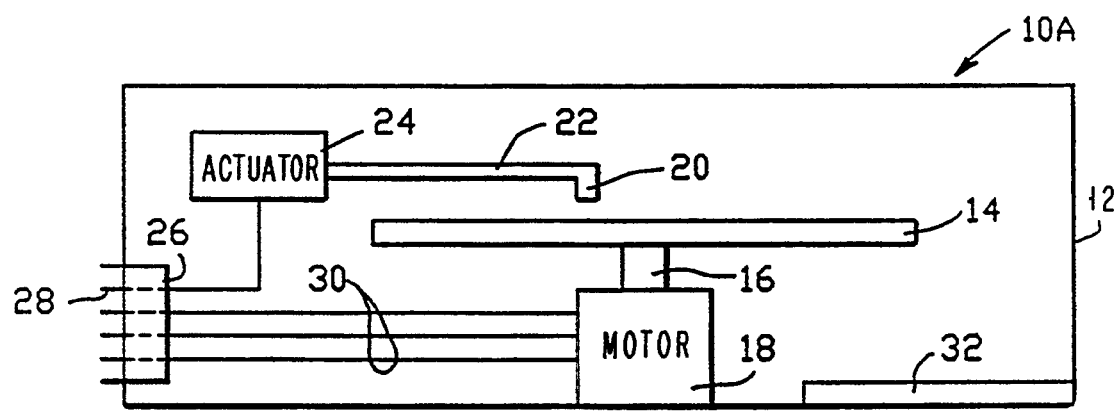
FIG. 2 is a cross-section of a variation of the embodiment of FIG. 1.
Figure 3:
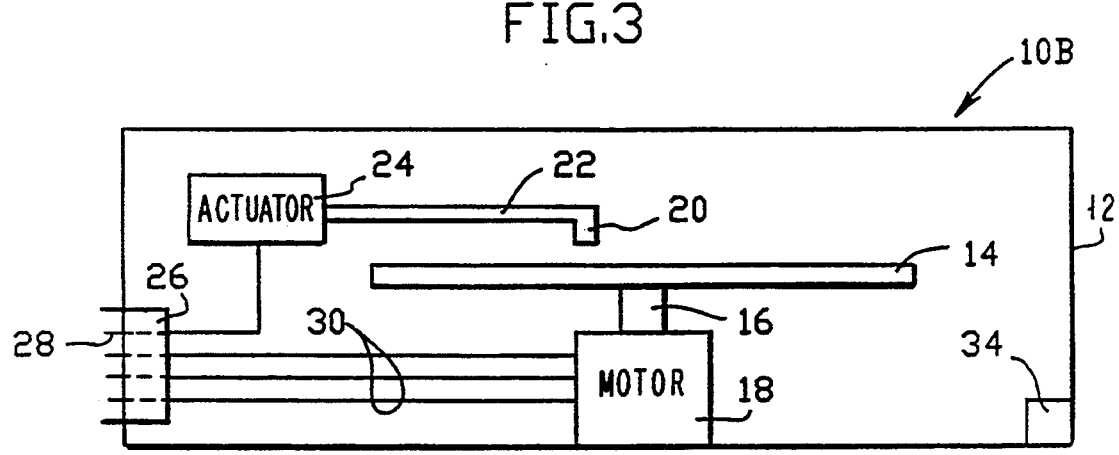
FIG. 3 is a cross-section of yet another embodiment of the invention.

In the various embodiments of the invention illustrated in FIG. 1, FIG. 2 and FIG. 3 like reference numerals will indicate like components.

Referring to FIG. 1, a direct access storage device includes a housing 12 containing a magnetic disk 14 on a spindle 16 rotated by a motor 18. A read/write head 20 on a suspension 22 is positioned over disk 14 by an actuator 24 as is well known in the art.

External connections to DASD 10 are made with a connector 26 mounted in an opening in housing 12. Housing 12 is hermetically sealed. By sealed, it is meant that the leakage rate is less than $10^{-6}$ cc (STP)/second and typically in the range of $10^{-6}$ to $10^{-9}$ cc (STP)/second. For example, the leakage rate may be on the order of $10^{-8}$ cc(STP)/second. Thus, less than ten percent of the free volume of gas in the assembly is exchanged over a five year period. For a small DASD with a free volume of 30 to 40 cc., approximately 4 cc of gas is exchanged with outside air in five years.

In accordance with a first embodiment of the invention, connector 26 contains connector pins 28 extending through a volume of a polyimide such as Kapton ®.

The typical operating range for a compact disk drive in, for example, a laptop computer is specified as between 10° C. and 60° C., although the invention may have application outside this temperature range.

If the internal free volume inside the device is 40 cc, to maintain the relative humidity within acceptable limits of 20 percent to 40 percent, it is necessary that the polyimide be capable of acting as a desiccant for approximately 2 milligrams of water. Over the temperature range indicated, the water, in the form of vapor in the free volume of the enclosure, will be in equilibrium with water absorbed by the polyimide. The absorption and desorption is completely reversible and the polyimide content of the connector will generally be sufficient to control the relative humidity over the indicated temperature range. If it is not, then wires 30, extending internally within DASD 10 between connector 26 and the components therein may be insulated with a polyimide which will also absorb and desorb water and together with that of connector 26 will absorb and desorb the required amount of water to maintain the relative humidity. This will be accomplished without any adverse effects on the insulating properties of wires 30. For example, for 2 milligrams of water, it has been determined that the required volume of polyimide is approximately 0.10 cc. This volume of polyimide can be achieved by using a film thickness and film area corresponding to the values in Table 1.

TABLE 1

| Kapton Thickness | Film Area |
|---|---|
| 2 mil | 18.8 cm$^2$ |
| 3 mil | 12.5 cm$^2$ |
| 5 mil | 7.5 cm$^2$ |

Referring to FIG. 2, as an alternative, the polyimide film 32 having the thickness and film area specified in Table 1 can simply be placed on an internal surface or surfaces of DASD 10A in an unobtrusive position. The relative humidity, over the indicated temperature range, is controlled in the same manner as it is controlled in the embodiment of FIG. 1.

Referring to FIG. 3, a small quantity of a conventional desiccant 34 is placed in the sealed housing of DASD 10B. This desiccant may be activated alumina or silica gel, or other high surface area oxides or desiccated gels based on silica and/or alumina and modified by the addition of other hydrous oxides such as titania, zirconia, boron oxide and magnesia.

In general, the isostere of a sealed volume, i.e. the equilibrium water vapor pressure as a function of temperature, absent a desiccant indicates that an initial relative humidity of 100 percent at 10° C. will drop to 5 percent relative humidity at 60° C. This range of humidity is unacceptable in a sealed direct access storage device. By proper selection of the desiccant material, its amount, and its fractional loading with water, the system isostere produces the appropriate equilibrium water vapor pressure (or, equivalently, the dew point temperature or the relative humidity) required throughout the operating range.

Figure 4:
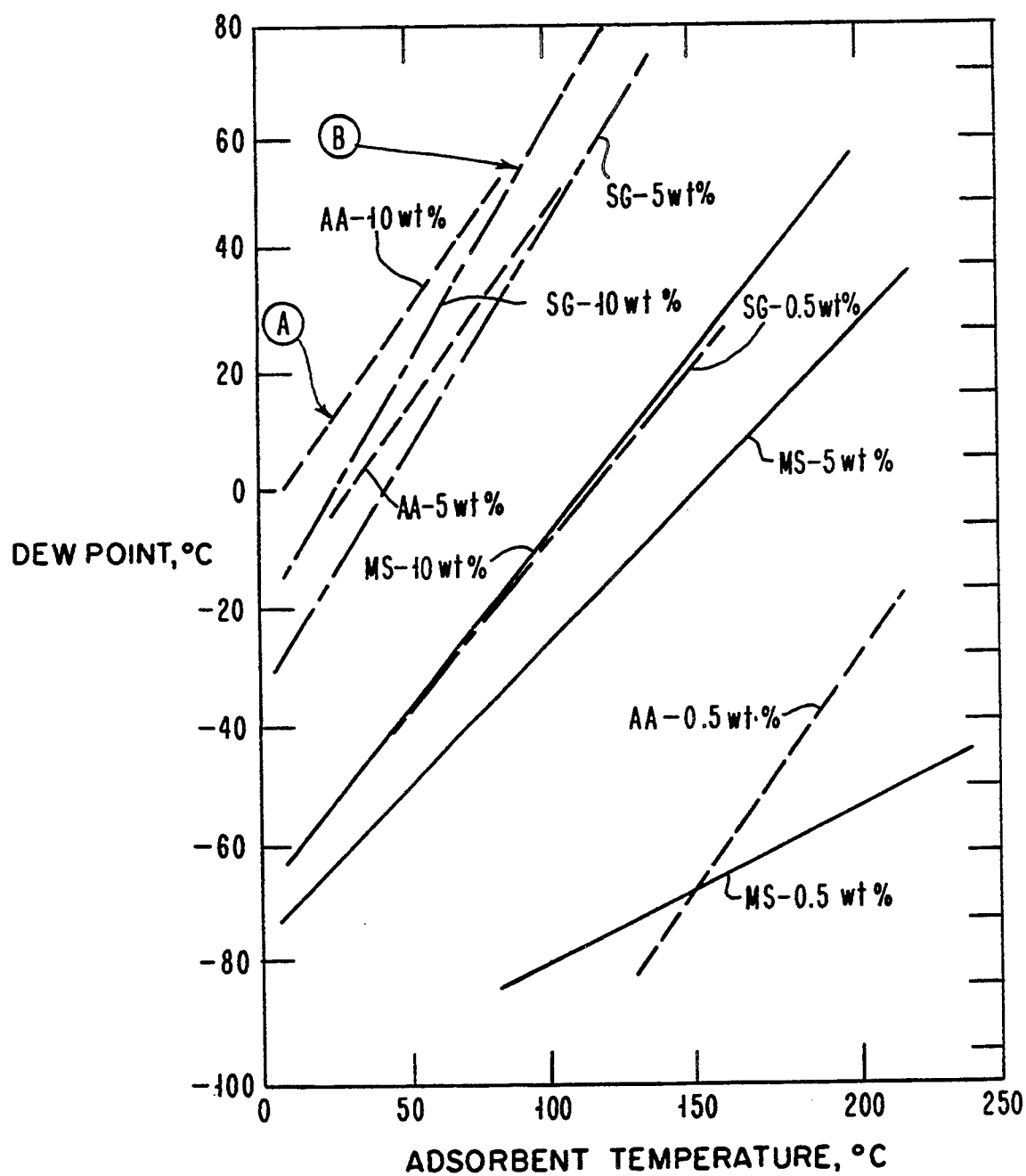
FIG. 4 is a graph illustrating the isosteres for activated alumina, silica gel and a molecular sieve material.

Referring to FIG. 4, isostere A for activated alumina desiccant loaded with 10 percent water by weight produces the conditions set forth in Table 2.

TABLE 2

| Temp | Dewpoint | Rel Humidity | Specific Humidity |
|---|---|---|---|
| 10° C. | 0.6 ° C. | 52% RH | 0.0039 |
| 60° C. | 36° C. | 29% RH | 0.0045 |

Again by way of example, in the specific temperature range, the mass of water to be added to or removed from the vapor in a typical 30 cc of free volume, is approximately 1.5 milligrams. The minimum mass of activated alumina, loaded with 10 percent water (by weight) is thus 16.5 milligrams. Since the typical bulk density of this desiccant is roughly 1 gram/cc, the volume needed for the desiccant is approximately 0.017 cc, which is negligible, and therefore does not necessitate any increase in the free volume of the assembly for the purpose of including the desiccant.

If silica gel preloaded with 10% of water (isostere B) is used, the mass of water which must be contained by the desiccant is approximately 1.2 milligrams, in order to have the conditions specified in Table 3.

TABLE 3

| Temp | Dewpoint | Rel Humidity | Specific Humidity |
|---|---|---|---|
| 10° C. | −15° C. | 15% RH | 0.0012 |
| 60° C. | 30° C. | 21% RH | 0.0322 |

This requires that the loaded desiccant mass be approximately 13.2 milligrams, thus occupying a volume of approximately 0.013 cc. While the relative humidity is lower than that in the case of the activated alumina, the humidity is controlled over a narrower range.

In general, desiccants with dew points for water below −15° C. at a temperature of 10° C. should be avoided, because of the rather low water vapor pressure and the undesirably low relative humidity that would be produced within the DASD.

While this invention has been described in connection with specific embodiments, it will be understood that those with skill in the art may be able to develop variations of the disclosed embodiments without departing from the spirit of the invention and the scope of the following claims.

We claim:

1. A direct access storage device including means for positioning a head for interaction with a storage medium comprising:
   an hermetically sealed housing enclosing the head and the storage medium; and
   a quantity of a desiccant contained in said housing, said desiccant containing a predetermined percentage of water, whereby relative humidity within said housing is maintained within a predetermined relative humidity range as temperature is varied over a predetermined temperature range so that the relative humidity is high enough to avoid poor start-stop tribology and low enough to avoid excessive sticking forces.

2. The direct access storage device of claim 1 wherein the desiccant is a desiccated gel derived from at least one hydrous oxide.

3. The direct access storage device of claim 1 wherein the desiccant is one of an oxide and a compound of several oxides.

4. The direct access storage device of claim 3 wherein the desiccant is activated alumina.

5. The direct access storage device of claim 4 wherein the activated alumina contains approximately 10 percent water by weight.

6. The direct access storage device of claim 4 wherein the relative humidity is maintained between approximately 52% and 10° C. and approximately 29% at 60° C.

7. The direct access storage device of claim 2 wherein the desiccant is silica gel.

8. The direct access storage device of claim 7 wherein the silica gel contains approximately 10 percent by weight water.

9. The direct access storage device of claim 7 wherein the relative humidity is maintained between approximately 15% at 10° C. and approximately 21% at 60° C.

10. The direct access storage device of claim 1 wherein the desiccant is a water absorbing polymer.

11. The direct access storage device of claim 10 wherein the water absorbing polymer is a polyimide.

12. The direct access storage device of claim 11 wherein the polyimide is Kapton ®.

13. The direct access storage device of claim 11 wherein the relative humidity is maintained between approximately 20% at 10° C. and approximately 40% at 60° C.

14. A direct access storage device including means for positioning a head for interaction with a storage medium comprising:
   an hermetically sealed housing containing the head and the storage medium;
   a predetermined quantity of a desiccant contained in said housing;
   a predetermined quantity of water contained in said housing, said water being partially in the form of water vapor in said housing and partially in the form of water contained in said desiccant, the water vapor in said housing and the water in said desiccant being in equilibrium at a given steady state temperature so that the relative humidity is high enough to avoid poor start-stop tribology and low enough to avoid excessive sticking forces.

15. A method for assembling a direct access storage device having a housing, and within the housing a head positioned for interaction with a storage medium, comprising the steps of
   a. placing a predetermined quantity of a desiccant within the housing;
   b. placing a predetermined amount of moisture within the housing; and
   c. hermetically sealing the housing whereby relative humidity within the housing is maintained within a predetermined relative humidity range, as temperature is varied over a predetermined temperature range so that the relative humidity is high enough to avoid poor start-stop tribology and low enough to avoid excessive sticking forces.

16. The method of claim 15 wherein the water is partially in the form of water vapor in the housing and partially in the form of water contained by said desiccant, the water vapor in the housing and the water vapor in the desiccant being in equilibrium at a given steady state temperature.

17. The method of claim 15 wherein the desiccant is desiccated gel derived from at least one hydrous oxide.

18. The method of claim 15 wherein the desiccant is one of an oxide and a compound of several oxides.

19. The method of claim 15 wherein the desiccant is activated alumina.

20. The method of claim 19 wherein the activated alumina contains approximately 10 percent water by weight.

21. The method of claim 15 wherein the desiccant is silica gel.

22. The method of claim 21 wherein the silica gel contains approximately 10 percent by weight water.

23. The method of claim 21 Wherein the desiccant is a water absorbing polymer.

24. The method of claim 15 wherein the desiccant is a water absorbing polymer.

25. The method of claim 23 wherein the water absorbing polymer is a polyimide.

26. The direct access storage device of claim 25 wherein the polyimide is Kapton ®.

27. The direct access storage device of claim 1 wherein the housing is sealed so that a leakage rate of less than substantially $10^{-6}$ cc (STP)/second is established.

28. The direct access storage device of claim 1 wherein the desiccant is a part of an internal component of the device.

29. The method of claim 15 wherein the housing is sealed so that a leakage rate of less than substantially $10^{-6}$ cc(STP)/second is established.

30. The direct access storage device of claim 28 wherein the internal component is a wire, and the desiccant is an insulator surrounding said wire.

31. The direct access storage device of claim 28 wherein the internal component is an electrical connector having connector pins, and the desiccant is an insulator through which said pins extend.

* * * * *